US006212854B1

(12) United States Patent
Tobin et al.

(10) Patent No.: US 6,212,854 B1
(45) Date of Patent: Apr. 10, 2001

(54) APPARATUS FOR CHARGING CANISTERS WITH A HIGH PRESSURE GAS

(75) Inventors: Brian P. Tobin, Bay City; Ronald W. Richardson, Jr., Essexville; James R. Harrington, Bay City; Douglas M. Leonard, Auburn, all of MI (US)

(73) Assignee: RWC, Inc., Bay City, MI (US)

( * ) Notice: Subject to any disclaimer, the term of this patent is extended or adjusted under 35 U.S.C. 154(b) by 0 days.

(21) Appl. No.: 09/481,800

(22) Filed: Aug. 26, 1998

Related U.S. Application Data

(63) Continuation of application No. 08/677,948, filed on Jul. 10, 1996, now Pat. No. 5,829,223.

(51) Int. Cl.[7] .................................................. B65B 31/00
(52) U.S. Cl. ........................ 53/80; 53/81; 53/82; 53/83; 141/2; 141/18
(58) Field of Search ........................... 53/79, 80, 81, 53/82, 83, 403, 432; 141/2, 18

(56) References Cited

U.S. PATENT DOCUMENTS

| 2,059,931 | 11/1936 | Cate | 53/80 |
|---|---|---|---|
| 2,101,156 | 12/1937 | Payne | 53/83 |
| 2,447,861 | 8/1948 | Junge | 141/18 |
| 3,834,118 | 9/1974 | Wakdrop et al. | 53/79 |
| 3,970,121 | 7/1976 | Brandt | 141/2 |
| 4,262,472 | * 4/1981 | Soeda et al. | 53/403 |
| 4,651,503 | 3/1987 | Anderson, III | 141/2 |
| 4,712,353 | 12/1987 | Bethell et al. | 53/80 |
| 4,982,555 | * 1/1991 | Ingemann | 53/432 |
| 5,196,669 | * 3/1993 | Richardson | 53/403 |
| 5,791,122 | 8/1998 | Tobin et al. | |

* cited by examiner

*Primary Examiner*—Eugene Kim
(74) *Attorney, Agent, or Firm*—Lalos & Keegan; Michael N. Lau

(57) ABSTRACT

An apparatus for charging a metallic canister having a filler opening therein with a gas under pressure and then sealing the opening to provide a closed, pressurized canister including means having a guide passageway therethrough, engageable with the canister in sealing engagement with the guide passageway communicating with the filler opening of the canister, means for conveying a gas under pressure to the guide passageway of the sealing means when the sealing means is disposed in sealing engagement with the canister, rotary means for dispensing a welding ball for delivery through the sealing means to be deposited on the canister across the filler opening therein and means for fusing the welding ball when positioned on the canister to close the filler opening in the canister.

34 Claims, 3 Drawing Sheets

APPARATUS FOR CHARGING CANISTERS WITH A HIGH PRESSURE GAS

This is a continuation of patent application Ser. No. 08/677,948 filed on Jul. 10, 1996, now U.S. Pat. No. 5,829,223.

BACKGROUND OF THE INVENTION

This invention relates to the manufacture of components for inflatable restraining systems used in automotive vehicles, and more particularly to an apparatus for charging metallic canisters used in such systems with a gas under high pressures and sealing such canisters while maintaining them under pressure.

In the prior art, there has been developed an apparatus for pressurizing metallic canisters used in inflatable restraining systems for automotive vehicles by injecting a gas under pressure through a filler opening provided in the canister and then sealing such filler opening while continuing to supply pressurized gas to the canister. Generally, such apparatus is provided with a member engageable in sealing relation with a canister being charged, having a guide passageway communicable with the filler opening of the canister. Such member can be either stationary with means for displacing the canister into sealing engagement with the member or displaceable with means for displacing the member into sealing engagement with the canister. In either of such arrangements, with the member disposed in sealing engagement with the canister and the guide passageway of the member communicating with the filler opening in the canister, means are provided for injecting an inert gas under pressure through the guide passageway in the sealing member and the filler opening in the canister to pressurize the canister, delivering a welding ball through the guide passageway of the sealing member so that it deposits on the canister across the filler opening therein and for extending a welding rod through the guide passageway in the sealing member to positively engage and fuse the welding ball and close the filler opening while continuing to maintain the canister under pressure. An example of such type of apparatus is described and claimed in U.S. Pat. No. 5,352,860.

Canisters intended to be pressurized by such type of apparatus often vary in configuration, wall thickness, filler opening size and charging pressure requirement. Accordingly, for such an apparatus to be effective and productive, it must be capable of pressurizing such canisters at pressures in the range of 3,500 to 10,500 psi, positively maintaining a seal between the sealing member and the canister to accommodate such high pressures, reliably delivering welding balls of different sizes to accommodate canister filler openings of different sizes, and effectively preventing leakage of gas, particularly through the welding ball feeding mechanism.

It thus has been found to be desirable to provide an apparatus of the type described which is capable of not only providing an effective seal between the sealing member and the canister and pressurizing the canister while maintaining such seal but of reliably feeding welding balls of different sizes to accommodate canisters of different filler hole sizes.

SUMMARY OF THE INVENTION

The present invention generally provides an apparatus comprising a sealing member having a passageway therethrough displaceable between a first position out of engagement with a canister to be pressurized and a second position engageable in sealing engagement with the canister with the guide passageway therein communicating with the filler opening in the canister, means for conveying a gas under pressure to the guide passageway of the sealing member when the sealing member is in sealing engagement with the canister, a rotary valve for feeding a welding ball through the guide passageway to cause the ball to deposit on the canister across the filler opening therein, while the sealing member is maintained in sealing engagement with the canister and the canister is under pressure, and a welding rod disposed in the guide passageway of the sealing member and displaceable into positive mechanical and electrical contact with a welding ball deposited on a canister for fusing the welding ball and welding closed the filler opening in the canister while continuing to maintain the sealing member in sealing engagement with the canister and the canister under pressure.

Preferably, the apparatus includes a gate displaceable between a first position in a nonobstructing relation to a welding ball conveying means and a second position in obstructing relation therewith, such gate is mechanically connected to the sealing member so that the gate is in a nonobstructing relation with a welding ball conveying means when the sealing member is disposed in its retracted position out of sealing engagement with a canister and in obstructing relation with the welding ball conveying means when the sealing member is disposed in its extended position in sealing engagement with a canister, and the rotary valve is operable to feed a welding ball into the welding ball conveying means when the gate is in obstructing relation with the welding ball conveying means for holding a welding ball in abeyance to be delivered to the guide passageway of the sealing member during the next operating cycle of the apparatus.

DESCRIPTION OF THE PREFERRED EMBODIMENT OF THE INVENTION

Figure 1:
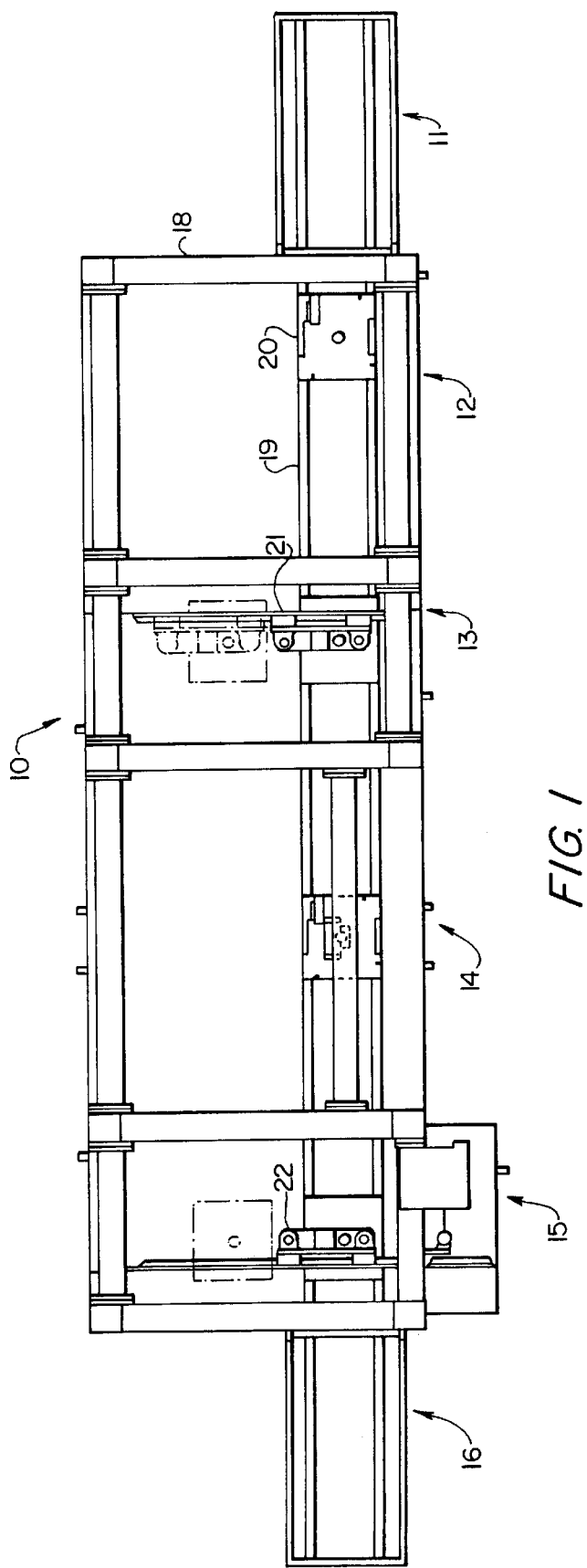
FIG. 1 is a top plan view of a system for loading an empty canister on a retaining fixture in a selected orientation, forming a gas filling opening in the canister, charging the canister with a gas under pressure through the formed opening and closing and sealing the opening, utilizing an apparatus embodying the present invention.

Referring to the drawings, there is illustrated a system for charging a metallic canister with an inert gas under pressure and then sealing the canister including an apparatus embodying the present invention. The system consists of an apparatus 10 including a canister loading station 11, a filler hole forming station 12, a preweighing station 13, a gas charging and sealing station 14, a post weighing station 15 and an unloading station 16 and a gas supply system 17. The apparatus is provided with a main frame 18 on which there is mounted a conveyor 19 for advancing a canister supporting pallet 20 sequentially from canister loading station 11 through unloading station 16. Each of such pallets includes a canister retaining fixture adapted to position the canister in a predetermined orientation to allow for the formation of a filler opening in the canister at the hole forming station and subsequent charging of a gas under pressure into the canister through the opening therein and the sealing of such opening at the gas charging and sealing station.

Mounted on the main frame at station 12 is a hole piercing assembly. Such assembly is positioned on the main frame relative to the conveyor so that when a pallet carrying a canister disposed in a selected orientation is positioned at station 12, the piercing tool of the assembly will be vertically aligned with the portion of a canister to be punctured. Mounted on the main frame at station 13 is a transfer mechanism 21 which is adapted to laterally displace a pallet 20 positioned at station 13, weigh the empty, pierced canister and transfer it laterally back onto the conveyor for advancement to station 14. A gas charging and sealing apparatus which embodies the present invention is mounted on the main frame at station 14 which functions to charge a canister supported on a pallet positioned at station 14 with a gas under pressure, and then seal the gas filling hole in the canister in a manner to be described.

Disposed between stations 14 and 15 or at station 15 is a means for detecting a defective canister. Also mounted at station 15 is a mechanism for post-weighing a filled and sealed canister positioned at station 15, and a defective canister processing assembly. Upon detection of a canister with a defective filling hole closure or an underweight or overweight canister positioned at station 15, the defective canister processing assembly will be operated to drill a relief hole in the canister and allow the release of gas from the canister. The pallet supporting canisters at station 15 are then transferred laterally by a mechanism 22 from where they are advanced to station 16 for unloading.

Preferably, conveyor 19 is an endless conveyor on which successive pallets 20 are spaced apart the distance between successive stations on the apparatus. Canisters loaded onto fixtures supported on pallets at the loading station are incrementally advanced by the conveyor sequentially to station 12 where the gas filling hole is formed, station 13 where the canister is preweighed, station 14 where the canister is charged with a gas under pressure and the gas filling hole in the canister is welded closed, station 15 where the canister is post-weighed and defective canisters are drilled to release the gas therein and station 16 where the canister is removed.

Figure 2:
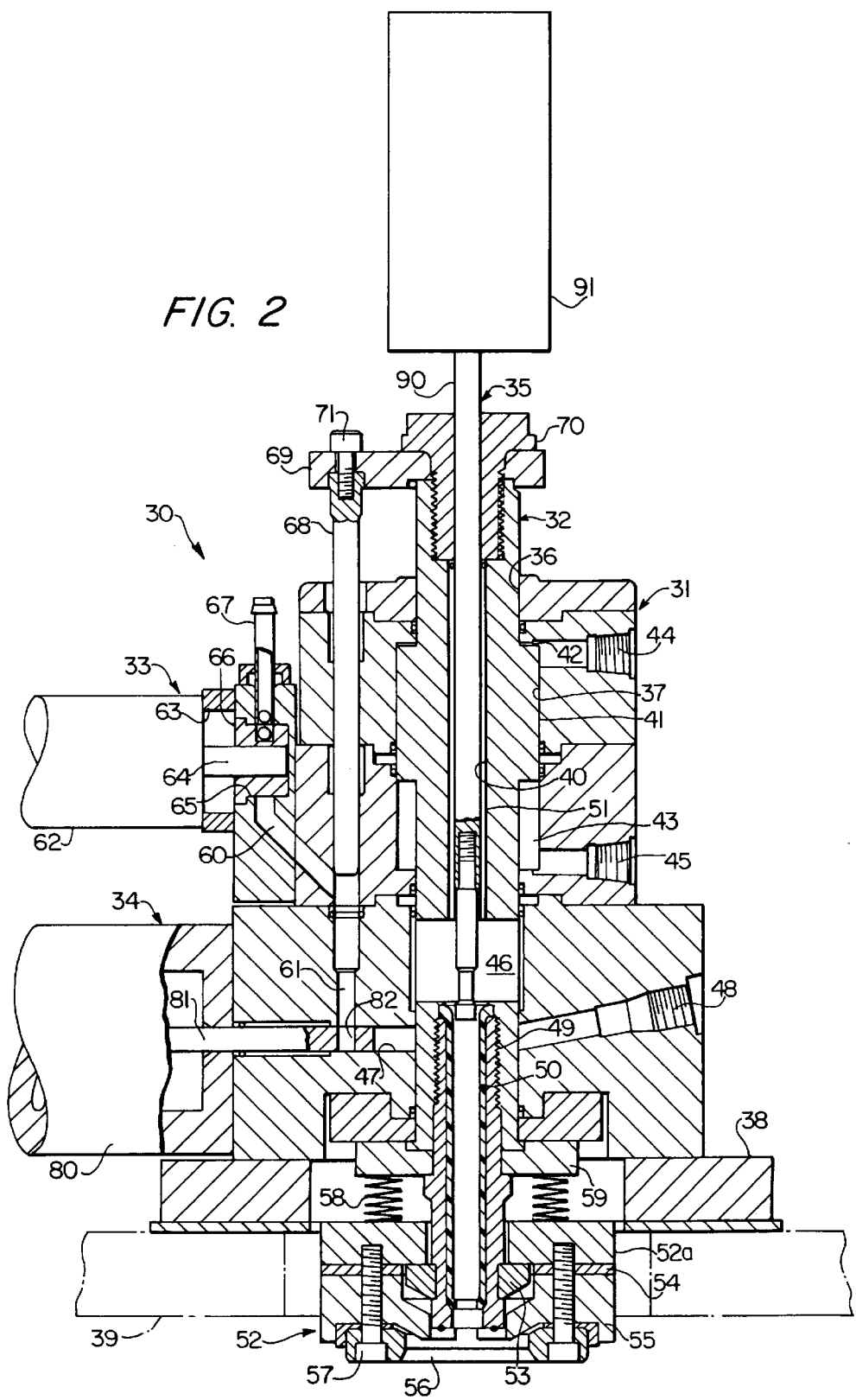
FIG. 2 is an enlarged, vertical cross-sectional view of the apparatus utilized in the system shown in FIG. 2 for sequentially filling the canister with a gas under pressure through a gas filling opening in the canister and then sealing such opening, embodying the present invention.

Referring to FIG. 2, there is shown an apparatus 30 which is mounted on the main frame of the apparatus shown in FIG. 1 for charging a canister positioned at station 14 with a gas under pressure through a filler opening in the canister formed at station 12, and then sealing such filler opening to provide a closed, pressurized canister. The assembly generally includes a housing 31, a sealing member 32, a welding ball feed mechanism 33, a welding ball transfer mechanism 34 and a welding rod assembly 35. The housing is formed of a number of annular steel plates bolted together to provide a longitudinal bore 36 therethrough having an enlarged section 37 provided with a cylindrical side wall and opposed, annular end walls. The housing is adapted to be seated on an annular member 38 mounted on a crosspiece member 39 of main frame 18.

Sealing member 32 is disposed in longitudinal bore 36 and is adapted to be displaced therein between a retracted position as shown in FIG. 2 and an extended position. The member is substantially tubular in configuration, providing an axially disposed guide passageway 40. It further is provided with an annular section 41 received within enlarged section 37 of opening 36. The sealing member with annular section 41 cooperates with the cylindrical side wall and annular end walls of enlarged section 37 to provide a pair of variable volume chambers 42 and 43. Communicating with chamber 42 is a fluid passageway 44. Similarly provided in housing 31 is a fluid passageway 45 which communicates with chamber 43. Suitable seals are provided between displaceable sealing member 32 and housing 31. It will be appreciated that by supplying fluid under pressure to one of chambers 42 and 43 while venting the other, annular section 41 will function as a piston to displace the sealing member between the retracted and extended positions in the conventional manner.

Sealing member 32 further is provided with a transversely disposed access opening 46 at a point intermediate annular section 41 and an end portion thereof. Access opening 46 communicates with guide passageway 40, and is adapted to be displaced between a first positioned as shown in FIG. 2 when the sealing member is in the retracted position, and a second position communicating with a ball transfer passageway 47 and a gas supply passageway 48 in the housing when the sealing member is in the extended position. The outer end of sealing member 32 is provided with an internally threaded opening into which a tip section 49 is threaded. The tip section is provided with a longitudinal passageway aligned with guide passageway 40, which is provided with an electrical insulating lining 50. Guide passageway 40 of the sealing member similarly is provided with an electrical insulating lining 51.

Preferably, access opening 46 is located at a point as close as possible to the dispensing end of the sealing member with communicable passageways 47 and 48 similarly being located at a lower end of the housing to minimize the length of path of gas injected through apparatus 30. Such opening, however, could be located at any suitable point along the length of the sealing member. Furthermore, although only a single access opening is provided in the embodiment shown in the drawings communicable with both passageways 47 and 48, it is contemplated within the scope of the invention to provide two separate access openings, one communicating with passageway 40 and communicable with passageway 47 and the other communicating with passageway 40 and communicable with passageway 48, when the sealing member is in the extended position. Furthermore, such two access openings can be longitudinally spaced along the length of the sealing member.

Mounted on a lower end of tip section 49 and adapted to engage a portion of a canister disposed about the periphery of the filler opening thereof, when the sealing member is in the extended position, is an electrical grounding assembly 52. The assembly includes an annular metallic supporting member 52a seated on an annular member 53 rigidly secured to and displaceable with tip section 49, an annular insulator spacer 54 mounted on the underside of member 52a, an annular member 55 mounted on the spacer, and an annular, canister engaging member 56, secured together by a set of bolts 57. Annular member 55 is provided with a portion having an inner diameter greater than the outer diameter of annular member 53 to permit longitudinal displacement of member 53 relative to member 55. Annular member 52a is urged into seating engagement with member 53 by means of a set of circumferentially spaced springs 58 interposed between an annular member 59 rigidly secured to and displaceable with the sealing member, and annular member 52a. It will be appreciated that when the sealing member is displaced to its extended position with the end section thereof engaging a canister, canister engaging member 56 will engage the canister about an outer perimeter of the filler opening therein in advance of tip section 49 engaging the canister about an inner perimeter of the filler opening, to provide a suitable mechanical and electrical contact with the canister. Such engagement is facilitated by springs 58 which function to urge and maintain engaging member 56 in positive mechanical and electrical contact with the canister. When annular engaging member 56 is in engagement with the canister, displacement of member 53 relative to member 55 is permitted by the spacing of member 53 and the inwardly extending portion of member 55, as the tip of the sealing member engages the canister about the periphery of the filler hole in sealing engagement therewith.

The function of welding ball feed mechanism 33 is to feed a welding ball to the ball transfer mechanism for injection through access passageway 41 and guide passageway 40 in the sealing member, causing it to drop and be deposited on a canister across the filler opening therein. The mechanism operates to meter a single ball at a time through passageways 60 and 61 in the housing to passageway 47 where it is transferred into the guide passageway of the sealing member through access passageway 46 in the sealing member by transfer mechanism 34. The feed mechanism includes a rotary actuator 62 having an end bracket 63 rigidly secured to housing 31 and a shaft 64 extending into a recess 65 in the housing having a cylindrical side wall. Mounted on the end of shaft 64 and disposed within recess 65 is an annular feed valve 66 having a substantially radially disposed pocket in the outer cylindrical surface thereof relative to the axis of shaft 64. In a first position as shown in FIG. 2, the ball receiving opening in feed valve 66 is adapted to register with and receive a single welding ball from a feed chute 67. The chute is connected to a continuous supply of welding balls which are guided through a flexible tube connected to the feed chute. In a second position angularly displaced 180° from the first position, the ball receiving opening is adapted to register with an inlet of passageway 60. It will be appreciated that with rotary feed valve 66 being in the position as shown in FIG. 2, a ball in the feed chute will be caused to be received in the ball receiving pocket of rotary feed valve 66 and upon rotating shaft 64 180°, such ball will be fed to passageway 60 from where it will be caused, if unobstructed, to be delivered to passageway 47.

The passage of a ball from passageway 60 to passageway 47 is controlled by a sliding gate 68 displaceable in passageway 61 between a retracted, nonobstructing position as shown in FIG. 2, and an extended, obstructing position, blocking the passage of a ball from passageway 60 into passageway 61. The displacement of the sliding gate between its retracted and extended positions is actuated by and thereby coordinated with the displacement of the sealing member by means of a floating connection between the outer end portions of such members. The connection is provided by an arm member 69 which is rigidly secured to the outer end of the sealing member by a threaded member 70 and connected to the sliding gate by a bolt 71 in a manner whereby the gate will be lifted when the sealing member is retracted and allowed to drop when the sealing member is extended. With such a connection, it will be appreciated that when the sealing member is in its retracted position as shown in FIG. 2, sliding gate 68 similarly will be in a retracted position with the opening between passageways 60 and 61 being unobstructed to permit a welding ball to pass therethrough into passageway 47. When the sealing member is in the extended position, the gate will be permitted to drop and close passageway 60.

When the sliding gate is in its extended position, a suitable seal is provided between the sliding gate and housing 31, at a point between passageways 60 and 47, to prevent a loss of gas under pressure injected through passageway 48.

Ball transfer mechanism 34 includes a pneumatic cylinder assembly 80 mounted on housing 31, having a ball transfer slide 81 received within ball transfer passageway 47 and displaceable therein between a retracted position as shown in FIG. 2 and an extended position. Ball transfer slide 81 includes a slot 82 therein which is adapted to register with passageway 61 when the slide is in the retracted position. The slide is adapted to displace to its extended position only upon the displacement of the sealing member into its extended position with access opening 46 registered with passageway 47 to permit the transfer slide to be received within access opening 46 of the sealing member and permit slot 82 to be aligned with guide passageway 40 in the sealing member to further permit a welding ball to drop into the guide passageway of the sealing member.

A suitable seal also is provided between transfer slide 81 and housing 31 at a point between the juncture of passageways 61 and 47 and an outer end of passageway 47, to further prevent the loss of gas under pressure injected through passageway 48.

Welding rod assembly 35 includes a welding rod 90 extending through guide passageway 40 and being displaceable between a retracted position as shown in FIG. 2 and an extended position engaging a welding ball deposited on a canister, across the filler opening therein. The upper end of the welding rod is secured to a support member 91 which is operatively connected to a pneumatic cylinder assembly for displacing the welding rod between its retracted and extended positions. The welding rod further is electrically connected to a secondary lead of a welding transformer with the electrical grounding assembly 52 connected to the other secondary lead of the transformer so that upon the sealing member being disposed in its extended position with canister engaging member 56 in positive mechanical and electrical engagement with a canister, the welding rod being in its extended position in positive mechanical and electrical contact with a welding ball deposited on the canister across the filler opening thereof, and alternating current being supplied, the welding ball will be caused to fuse and thus flow and seal the filler opening closed.

A suitable seal also is provided between welding rod 90 and sealing member 32, again to prevent a loss of gas under pressure injected through passageway 48 when the sealing member is in the extended position.

Gas supply system 17 functions to provide gas under pressure to normally urge sealing member 32 in its retracted position out of engagement with a canister to be pressurized, advance the sealing member into its extended position in sealing engagement with a canister, with the guide passageway therein in communication with the filler opening in the canister and transverse access opening 46 thereof in communication with ball transfer passageway 47 and fluid passageway 48, and further to supply a gas under pressure through passageways 48, 46 and 40 to pressurize the canister through the filler opening therein when the sealing member is in its extended position providing a fluid tight seal between the sealing member and the canister. The system includes a main fluid supply line 100 provided with a pair of branch lines 101 and 102. Main fluid line 100 is connected to a source of fluid under pressure and includes an accumulator 103 and a main shut-off valve 104. Branch line 101 is connected to fluid passageway 48 and includes a pressure regulator 105, a relief valve 106 and a pneumatically actuated valve 107. Connected to branch line 101 between valve 107 and fluid passageway 48 is a branch line 108 provided with a pneumatically actuated valve 109. Valve 107 is normally in the closed position and valve 109 normally is in the open position. Such valves are operated by an electrically operated solenoid valves 110 and 110a.

Branch line 102 is connected to fluid passageway 44 of apparatus 30 and is provided with a pressure regulator 111 and a pneumatically actuated valve 112. Interconnecting fluid line 102 at a point between pressure regulator 111 and valve 112 is a branch line 113 connected to fluid passageway 45 of apparatus 30. Such branch line includes a pressure regulator 114 and a pneumatically actuated valve 115. Valve 112 is normally positioned to vent fluid passageway 44, and valve 115 is normally in the closed position to provide fluid under pressure to fluid passageway 45 of apparatus 30. Valves 112 and 115 are operated by electrically operated solenoid valves 116 and 116a.

A conventional controller is used to operate solenoid valves 110, 110a, 116 and 116a and solenoid valves controlling the operations of rotary actuator 62, cylinder assembly 80 and the cylinder assembly for displacing the welding rod assembly, and to energize the welding rod circuit, in a proper sequence to charge and seal a canister in a manner as hereinafter described.

OPERATION

Figure 3:
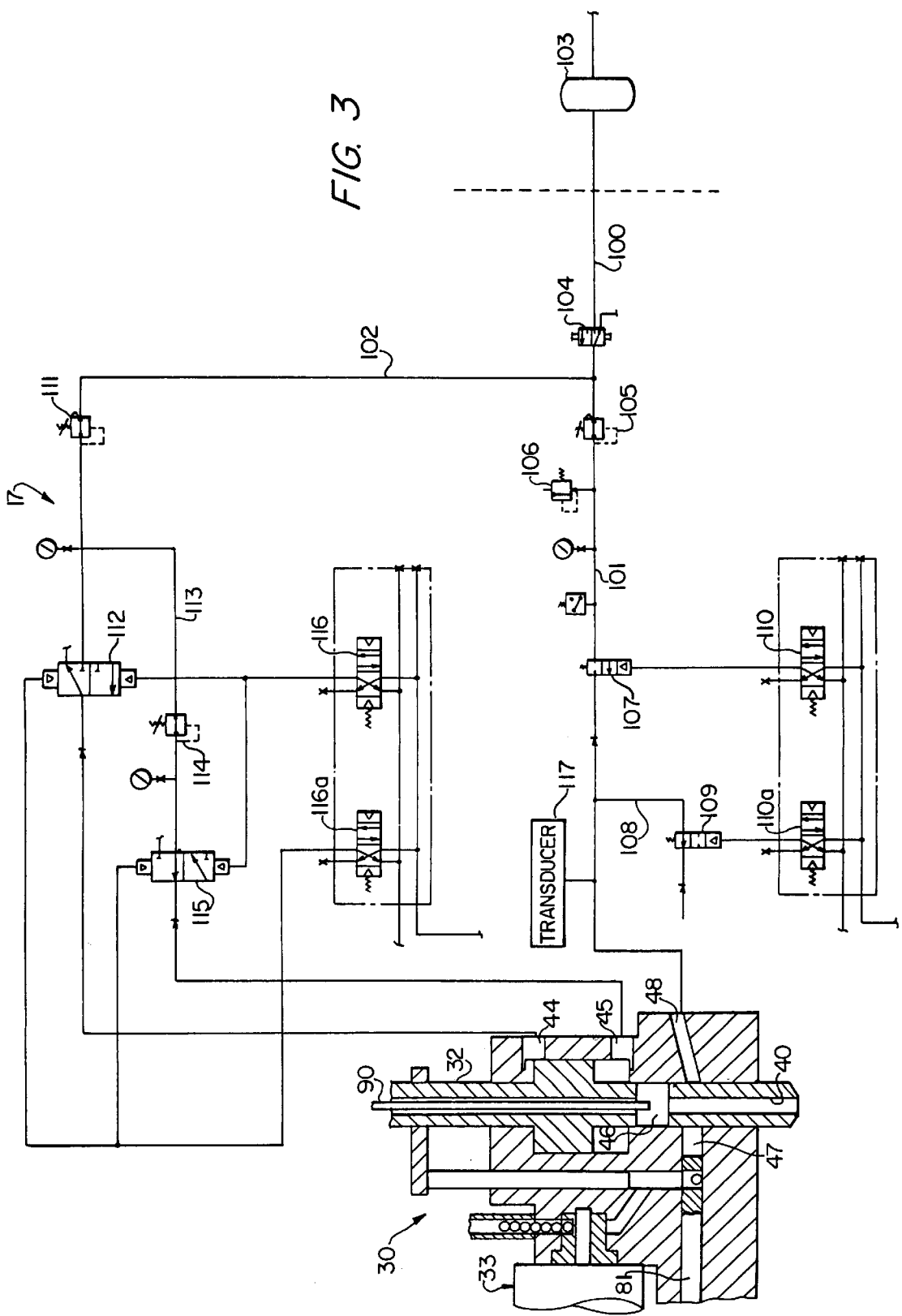
FIG. 3 is a schematic-diagrammatic view of the apparatus shown in FIG. 2 and the fluid supply system therefor.

With a main line pressure of 10,000 psi, pressure regulator 105 set at 4,500 psi, pressure regulator 111 set at 5,000 psi, pressure regulator 114 set at 500 psi and the various valves being in the positions as shown in FIG. 3, gas under a pressure of 500 psi will be supplied to fluid passageway 45 of assembly 30 to cause the sealing member to be urged into its retracted position as shown in FIGS. 2 and 3. Upon a canister being positioned at station 14 with its filler opening aligned with the guide passageway of sealing member 32, the controller will operate solenoid valves 116 and 116a to shift valves 115 and 112 to vent fluid passageway 45 and supply a gas under 5,000 psi to fluid passageway 44 of apparatus 30. Under such conditions, sealing member 32 will be displaced from its retracted to its extended position so that electrical ground assembly 52 will engage the canister about an outer perimeter of the filler hole therein to provide a positive mechanical and electrical contact, and sequentially tip section 49 of the sealing member will engage the canister about an inner perimeter of the filler hole therein in sealing engagement, with guide passageway 40 in the sealing member communicating with the interior of the canister through the filler opening.

The force applied on the sealing member in contact with the canister would be sufficient to provide an effective seal yet not allow the canister to collapse, unduly deform or become unduly stressed. Upon the seal between the sealing member and canister having thus been formed, the controller next functions to operate valves 110 and 110a to open valve 107 and close valve 109. Under such condition, gas under a pressure of 4,500 psi will be supplied to fluid passageway 48 to pressurize the canister. Valve 107 is then closed. While maintaining such pressure, transfer mechanism 34 is operated to displace transfer slide 81 from its retracted position as shown in FIG. 2 to its extended position within access opening 46 of the sealing member, allowing a welding ball having been deposited in slot 82 of the transfer slide to drop through the lower end of guide passageway 40 and be deposited on the canister across the filler opening therein, in alignment with welding rod 90. The transfer slide is then returned to its "home" position as shown in FIG. 2.

With the welding ball thus positioned and the filling pressure maintained, the controller next functions to sequentially displace the welding rod from the retracted position as shown in FIG. 2 to an extended position in positive mechanical and electrical contact with the welding ball seated across the filler opening in the canister, and energize the welding circuit, causing the welding ball to fuse and close the filler opening in the pressurized canister.

While the sealing member is in the extended position, sliding gate 68 similarly will be in an extended position blocking communication of ball passageway 60 with ball passageway 61. Under such circumstances, the controller will function to operate rotary actuator 62 causing the shaft to rotate 180° to transfer a ball in the recess of annular feed valve 66 to ball passageway 60 where it rolls down against extended sliding gate 68, postured to fall into and through ball passageway 61 and be received in slot 82 of the transfer slide when the transfer slide is in its retracted position and the sliding gate is next displaced to its retracted position.

Upon the passage of a predetermined interval of time to allow the fused ball to solidify and form a closure in the filler opening of the canister, the controller functions to operate valve 110a to open valve 109 to vent passageway 48. Once the charging assembly has been evacuated, the controller functions to again close valve 109 and the pressure in the charging assembly is sensed to determine whether there is any leakage through the fused seal. The controller then functions to shift valve 112 to vent fluid passageway 44 and close valve 115 to again pressurize fluid passageway 45 and correspondingly cause sealing member 32 to retract to the position as shown in FIGS. 2 and 3. The gas charging and sealing assembly is then positioned to begin a new cycle as the next canister is advanced into position.

Under circumstances where it is desired first to test the structural integrity of the canister prior to pressurizing it to its operating pressure, the same procedure may be followed except for setting pressure regulator 105 at a pressure greater than the desired fill pressure, in the order of perhaps 8,500 psi, to initially pressurize the canister at such elevated pressure, and for then operating valves 110 and 110a to sequentially close valve 107 and bleed gas from the canister by opening valve 109 until the pressure in the canister is reduced to the operating pressure of 4,500 psi. To control such pressure reduction, a transducer 117 is provided to sense the pressure in the canister and cause the controller to close valve 109 when the desired operating pressure in the canister has been reached.

In addition to branch line 113 being used to cause a retraction of the sealing member, the setting in pressure regulator 114 may be set at different settings and valve 115 may be opened to supply gas under pressure to fluid passageway 14 while gas under pressure is supplied to fluid passageway 44 to provide a pressure differential across the sealing member. Under such circumstances, the force applied on the sealing member may be varied to correspondingly vary the force applied in forming the seal. With such capability, canisters formed of different materials or possibly having different wall thicknesses may be accommodated without causing structural damage to such canisters in forming the seal as described.

The settings of the pressure regulators may be set at any desired settings depending on the required filling pressures or the required testing and filling pressures. Preferably, the sealing pressure determined by pressure regulator 111 would be in the range of 2,000 to 5,000 psi and the testing and fill pressures determined by pressure regulator 105 would be in the range of 3,500 to 10,500 psi. The retract pressure determined by pressure regulator 114 can be set at any lower pressure such as 500 psi, sufficient to provide a force to retract the sealing member except when it may be desired to provide a differential pressure to more accurately control the sealing force of the sealing member as previously described.

To provide even greater flexibility in accommodating canisters having different size filler openings, the width or diameter and depth of the ball receiving pocket in annular feed valve 66 and the width of ball receiving slot 82 in the transfer slide are made sufficiently large to accommodate welding balls of different sizes. Alternatively, different feed valves and transfer slides accommodating different size welding balls may be used.

By the use of independent sources of pressure for effecting the seal between the sealing member and the canister, and for pressurizing the canister, an effective and consistent seal is provided during the canister pressurization operation and particularly during the application of variable pressures as during the testing and filling procedure as previously described. In addition, the use of such separate sources of pressure permits the application of a differential pressure on the sealing member providing a greater flexibility in operation.

From the foregoing detailed description, it will be evident that there are a number of changes, adaptations and modifications of the present invention which come within the province of those having ordinary skill in the art to which the aforementioned invention pertains. However, it is intended that all such variations not departing from the spirit of the invention be considered as within the scope thereof as limited solely by the appended claims.

What is claimed is:

1. An assembly for charging a canister having a filler opening therein with a gas under pressure and then sealing said opening to provide a closed, pressurized canister comprising:

support means for supporting;

sealing means for sealing disposed on said support means, displaceable relative to said support means between a retracted position out of sealing engagement with said canister and an extended position in sealing engagement with said canister, having means defining a guide passageway therethrough communicating with said filler opening of said canister when in said extended position in sealing engagement with said canister;

means having a guide passageway therethrough, engageable with said canister in sealing engagement with said guide passageway communicating with said filler opening of said canister;

means for conveying a gas under pressure to said guide passageway of said sealing means when said sealing means is disposed in sealing engagement with said canister;

dispensing means for dispensing a welding ball for delivery through said guide passageway of said sealing means to be deposited on said canister across said filler opening therein;

conveying means for conveying said welding ball from said dispensing means to said guide passageway of said sealing means when said sealing means is disposed in sealing engagement with said canister; and displacing means for displaceable between a first position in an obstructing relation with said welding ball conveying means when said sealing means is disposed in said sealing engagement with said canister, and a second position in an non-obstructing relation with said welding ball conveying means when said sealing means is disposed in said retracted position.

2. An assembly according to claim 1 wherein said sealing means includes a welding rod disposed in said guide passageway displaceable between a retracted position out of engagement with a welding ball positioned on said canister and an extended position in positive mechanical and electrical engagement with said welding ball.

3. An apparatus according to claim 1 including means disposed in said welding ball conveying means for transferring said welding ball from said welding conveying means to said guide passageway of said sealing means when said sealing means is disposed in its extended position in sealing engagement with said canister.

4. An apparatus according to claim 2 including means for conveying said welding ball from said dispensing means to said guide passageway of said sealing means when said sealing means is disposed in said extended position in sealing engagement with said canister.

5. An assembly according to claim 4 including means displaceable between a first position out of obstructing relation with said welding ball conveying means when said sealing means is disposed out of said sealing engagement with said canister, and a second position in obstructing relation with said welding ball conveying means when said sealing means is disposed in said extended position in sealing engagement with said canister.

6. An apparatus according to claim 5 wherein said obstructing means is mechanically connected to said sealing means for displacement therewith.

7. An apparatus according to claim 5 including means disposed in said welding ball conveying means for transferring said welding ball from said welding ball conveying means to said guide passageway of said sealing means when said sealing means is in said extended position in sealing engagement with said canister.

8. An apparatus according to claim 1 wherein said obstructing means is mechanically connected to said sealing means for displacement therewith.

9. An apparatus according to claim 1 wherein said rotary dispensing means includes a valve member having a welding ball receiving pocket therein pivotally displaceable between a first position for receiving a welding ball therein and a second position for discharging said welding ball therefrom.

10. An apparatus according to claim 9 including a rotary actuator for pivoting said valve member between said first and second positions.

11. An apparatus according to claim 10 wherein said rotary actuator is operable when said sealing means is disposed in sealing engagement with said canister.

12. An assembly according to claim 9 including a chute for feeding said welding balls into said pocket of said valve member when said valve member is disposed in said first position.

13. An assembly according to claim 9 wherein said first and second positions of said valve member are angularly displaced 180 degrees apart.

14. An apparatus according to claim 9 including means for conveying said welding ball from said rotary valve member to said guide passageway when said sealing means is disposed in said extended position in sealing engagement with said canister.

15. An apparatus according to claim 9 including means displaceable between a first position out of obstructing relation with said welding ball conveying means when said sealing means is disposed in said retracted position out of sealing engagement with said canister and a second position in obstructing relation with said welding ball conveying means when said sealing means is disposed in said extended position in sealing engagement with said canister.

16. An apparatus according to claim 9 including means disposed in said welding ball conveying means for transferring said welding ball from said welding ball conveying means to said guide passageway of said sealing means when said sealing means is disposed in said extended position in sealing engagement with said canister.

17. An apparatus according to claim 2 wherein said rotary dispensing means includes a valve member having a welding ball receiving pocket therein pivotally displaceable between a first position for receiving a welding ball therein and a second position for discharging said welding ball therefrom.

18. An apparatus according to claim 17 including a rotary actuator for pivoting said valve member between said first and second positions.

19. An assembly according to claim 18 wherein said rotary actuator is operable when said sealing means is disposed in said extended position in engagement with said canister.

20. An apparatus according to claim 17 including a chute for feeding said welding balls into said pocket of said valve member when said valve member is in said first position.

21. An assembly according to claim 17 wherein said first and second positions of said rotary valve member are angularly displaced 180 degrees apart.

22. An apparatus according to claim 17 including means for conveying said welding balls from said rotary valve member to said guide passageway of said sealing member when said sealing member s disposed in said extended position in sealing engagement with said canister.

23. An apparatus according to claim 22 including means displaceable between a first position out of obstructing relation with said welding ball conveying means when said sealing means is disposed in said retracted position out of sealing engagement with said canister, and a second position in obstructing relation with said welding ball conveying means when said sealing means is disposed in said extended position in sealing engagement with said canister.

24. An assembly according to claim 23 wherein said obstructing means is mechanically connected to said sealing means for displacement therewith.

25. An apparatus according to claim 22 including means disposed in said welding ball conveying means for transferring said welding ball from said welding ball conveying means to said guide passageway of said sealing means when said sealing means is disposed in said extended position in sealing engagement with said canister.

26. An apparatus according to claim 25 wherein said obstructing means is mechanically connected to said sealing means for displacement therewith.

27. An apparatus for charging a canister with a gas under pressure through a filler opening therein and sealing said filler opening with a fused welding ball, including support means, sealing means disposed on said support means, displaceable relative to said support means between a retracted position out of sealing engagement with said canister and an extended position in sealing engagement with said canister and having means defining a guide passageway therethrough communicating with said filler opening of said canister when in said extended position in sealing engagement with said canister having a sealing member disposable in sealing engagement with said canister, with a guide passageway therein communicable with said filler opening, means for injecting a gas under pressure into said guide passageway when said sealing means is disposed in sealing engagement with said canister and a welding rod disposable in engagement with a welding ball disposed on said canister across said filler opening therein, a mechanism for feeding said welding balls to said filler opening when said sealing means is in sealing engagement with said canister comprising:

means for holding a supply of welding balls;

means for conveying said welding balls to said guide passageway of said sealing member when said sealing member is disposed in sealing engagement with said canister; and a rotary valve operable for feeding individual welding balls from said holding means to said conveying means, wherein said valve includes a ball receiving pocket and is operable to position said pocket in a first position for receiving a ball from said holding means and in a second position for discharging a ball into said conveying means;

a gate displaceable between a first position out of obstructing relation with said conveying means when said sealing member is out of sealing engagement with said canister, and a second position in obstructing relation with said conveying means when said sealing member is in sealing engagement with said canister.

28. A mechanism according to claim 27 including means disposed in said conveying means for transferring said welding ball from said conveying means to said guide passageway when said sealing means is disposed in said sealing engagement with said canister.

29. A mechanism according to claim 27 wherein said gate is connected to said sealing member for displacement therewith.

30. A mechanism according to claim 27 wherein said gate comprises a sliding member.

31. A mechanism according to claim 29 wherein said sliding gate is mechanically connected to said sealing member for displacement therewith.

32. A mechanism according to claim 27 including a rotary actuator for pivotally displacing said rotary valve between said first and second positions.

33. A mechanism according to claim 31 wherein said rotary actuator is operable to pivotally displace said rotary valve from said first to second positions when said sealing means is disposed in sealing engagement with said canister.

34. An apparatus for charging a canister having a filler opening therein with a gas under pressure and then sealing said filler opening to provide a closed, pressurized canister comprising:

sealing means having a guide passageway therein, displaceable between an extended position in sealing engagement with a canister, with said guide passageway therein communicating with said filler opening in said canister, and a retracted position out of sealing engagement with said canister;

first means for supplying a gas under pressure to a first side of said sealing means to urge said sealing means into said retracted position;

second means for supplying a gas under pressure to a second side of said sealing means opposite said first side to urge said sealing means into said extended position in sealing engagement with said canister;

rotary means for dispensing a welding ball for delivery through said guide passageway of said sealing means to be deposited on said canister across said filler opening therein, wherein said rotary dispensing means includes a valve member having a welding ball receiving pocket therein pivotally displaceable between a first position for receiving a welding ball therein and a second position for discharging said welding ball therefrom.

* * * * *